July 16, 1963
A. WINKLER ETAL
3,097,582
SCANNING ASSEMBLY FOR CAMERAS
Filed March 22, 1961
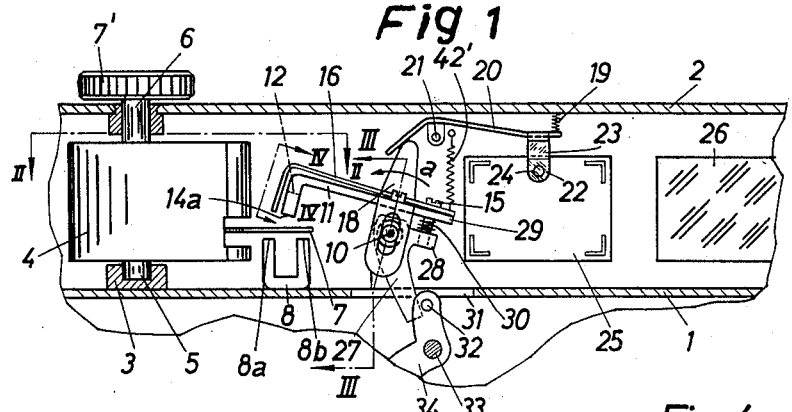
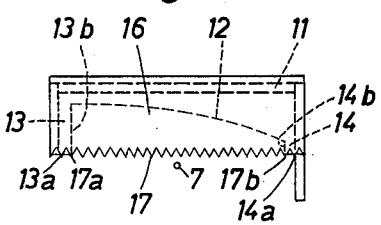
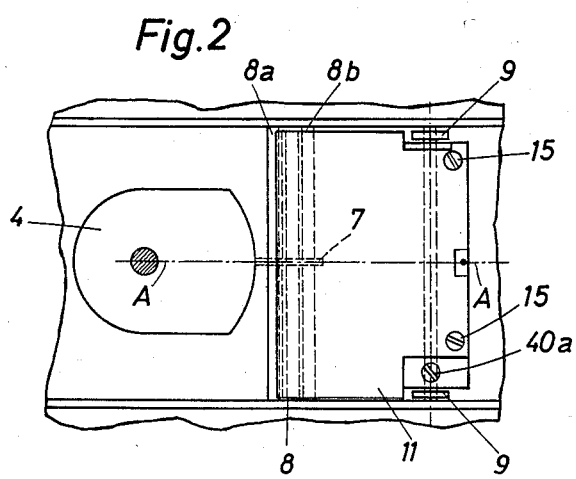
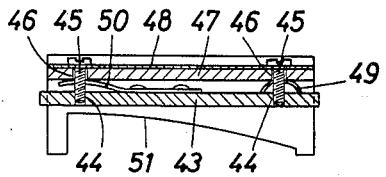
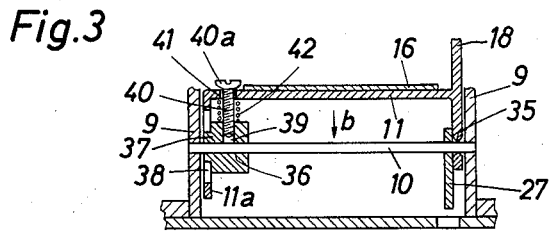
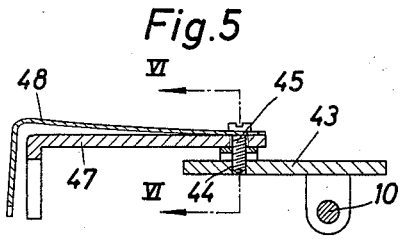
INVENTOR.
ALFRED WINKLER
FRANZ JAKOB
BY

3,097,582
SCANNING ASSEMBLY FOR CAMERAS
Alfred Winkler, Munich, and Franz Jakob, Unterhaching, near Munich, Germany, assignors to Agfa Aktiengesellschaft, Leverkusen-Bayerwerk, Germany
Filed Mar. 22, 1961, Ser. No. 97,665
Claims priority, application Germany Apr. 2, 1960
17 Claims. (Cl. 95—10)

The present invention relates to cameras.

More particularly, the present invention relates to scanning assemblies for cameras which are provided with light meters for measuring the lighting conditions under which an exposure is made.

It is a primary object of the present invention to provide a scanning assembly which is exceedingly simple and reliable in operation.

Another object of the present invention is to provide a scanning assembly which can be quickly and easily adjusted so as to operate with precise accuracy.

A further object of the present invention is to provide in cooperation with the scanning assembly an indicating means which indicates to the operator whether or not the lighting conditions are such that a proper exposure can be made.

Still another object of the present invention is to provide a scanning assembly with a means which will automatically prevent operation under borderline conditions between the lighting conditions where an exposure can properly be made and the lighting conditions where a proper exposure cannot be made.

It is also an object of the present invention to provide a scanning assembly which is composed of simple rugged elements which are easy to assemble and disassemble and which are easily accessible for the purposes of adjustment.

With the above objects in view the invention includes, in a camera, a support means and an elongated stop means carried by the support means. A scanning lever means is turnably carried by the support means for movement about an axis which is substantially parallel to the elongated stop means, and the scanning lever means has an elongated scanning edge which is directed toward the stop means. The lever means is turnable about the above axis from a rest position where the scanning edge is spaced from and defines an elongated gap with the stop means to a scanning position where the scanning edge of the scanning lever means is closely adjacent to the stop means. An electrical instrument is carried by the support means and forms part of a light-measuring assembly, and this instrument includes a turnable pointer part of which is located at all times in the above gap, so that when the lever means turns from the above-mentioned rest position to the scanning position, the pointer of the electrical instrument will engage the stop means and will limit the turning of the lever means while engaged by the scanning edge thereof, so that in this way the pointer of the electrical instrument determines the extent of turning of the lever means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional front elevation of the upper part of a camera provided with the structure of the invention;

FIG. 2 is a fragmentary plan view taken along line II—II of FIG. 1 in the direction of the arrows;

FIG. 3 is a transverse sectional view taken along line III—III of FIG. 1 in the direction of the arrows;

FIG. 4 is a transverse view taken along line IV—IV of FIG. 1 in the direction of the arrows;

FIG. 5 is a longitudinal section illustrating another embodiment of a scanning lever means according to the present invention; and FIG. 6 is a transverse section of the structure of FIG. 5 taken along line VI—VI of FIG. 5 in the direction of the arrows.

Referring to FIG. 1, there is shown therein the upper wall 1 of a camera housing which carries on its upper wall a hollow cap member 2 within which is housed various elements such as the range finder, the view finder, and the like. Within this space defined by the cap 2 and the upper wall 1 of the camera is also located the light-measuring assembly which includes the electrical instrument 4 which may be a galvanometer. A stationary bearing 3 is fixedly carried by the upper wall 1 of the housing of the camera and a pin 5 is fixed to the exterior housing of the instrument 4 and is turnable in the bearing 3 so that in this way the electrical instrument 4 is supported for rotary movement. Coaxial with the pin 5 is an additional pin 6 which extends through a suitable bearing carried by the upper wall of the cap member 2 to the exterior of the camera where the pin 6 is fixed with a knob 7', so that the instrument 4 can be manually turned by the operator about the common axis of the pins 5 and 6. This latter axis coincides with the axis of turning of the rotor of the instrument which is not shown and which is located within the housing of the instrument 4, and a pointer 7 of the instrument is fixed to the rotor thereof for turning movement therewith about the common axis of the pins 5 and 6. The instrument 4 may be manually turned by manipulation of the knob 7' for introducing into the camera the factor of the speed of the film which is used in the camera. Such angular positioning of an electrical instrument of a light meter assembly for introducing the factor of film speed is well known. Thus, the cap 2 together with the wall 1 and the bearing 3 as well as the pins 5 and 6 form a support means supporting the instrument 4 of the light-measuring assembly. As is well known light which reaches the camera impinges on a photocell, for example, which is connected electrically with the instrument 4 for turning the rotor thereof and thus locating the pointer 7 at an angular position which is indicative of the lighting conditions. It is also possible to use with the instrument 4 an electrical resistor which receives the light and which has the characteristic of varying its resistance according to the light intensity so as to cause the rotor of the instrument 4 which is located in a suitable electrical circuit with such resistor to turn so as to also locate the pointer 7 at a position which is indicative of the light intensity.

The support means which includes the upper wall 1 of the camera housing fixedly supports an elongated stop means 8 in the form of an elongated channel member having a pair of spaced, parallel upwardly directed side walls which terminate in upper free edges 8a and 8b, and it will be noted that these upper edges 8a and 8b of the stop means 8 are located in a plane which is parallel to the plane in which the pointer 7 turns, this pointer 7 extending over the stop means 8 in the manner shown in FIG. 1. The elongated stop means 8 extends perpendicularly across the line A—A shown in FIG. 2, this latter line being substantially the midpoint of the range of turning of the pointer 7.

The support means includes also, as shown in FIGS. 2 and 3, a pair of upstanding wall members 9 fixedly carried by the wall 1 and carrying a shaft 10 on which a scanning lever means 11 is turnably supported, so that the support means supports the scanning lever means 11 for turning movement about the axis of the shaft 10. This latter axis extends substantially parallel to the elongated stop means 8. The scanning lever means 11 has its left end portion, as viewed in FIG. 1, located over the space between the upper edges 8a and 8b of the elongated stop means 8, and at this end of the lever means 11 the lever means is provided with an elongated scanning edge 12 which is curved (FIG. 4) and which is directed toward the stop means 8. The scanning lever means 11 is shown in its rest position in FIG. 1, and in this rest position the scanning edge 12 and the stop means 8 define between themselves an elongated gap in which the pointer 7 of the instrument 4 is always located. It will be noted that the plane in which the pointer 7 turns extends through this gap defined between the stop means 8 and the scanning edge 12 of the scanning lever means 11. The lever means 11 is turnable in the direction of the arrow a of FIG. 1 from the rest position shown in FIG. 1 to a scanning position where the edge 12 is located closely adjacent to the stop means 8 and engages the pointer 7 which rests against the edges 8a and 8b of the stop means 8. As is apparent from FIG. 1, the scanning lever means 11 has a top wall and at its left end a substantially flat wall extending downwardly from the top wall toward the stop means 8, and it is this wall at the left end of the scanning lever means 11, as viewed in FIG. 1, which is formed with a cutout extending inwardly from the bottom edge of this left end wall and providing the scanning lever means with the scanning edge 12 which is located substantially in the plane occupied by this left end wall and which is shown in dotted lines in FIG. 4. The formation of the cutout which provides the scanning lever means with the scanning edge 12, which is curved as shown in FIG. 4, leaves the end wall of the scanning lever means 11 with a pair of extensions 13 and 14 respectively located at the ends of the scanning edge 12, as shown in FIG. 4, and terminating in a pair of additional edge portions 13a and 14a respectively located at the ends of the scanning edge 12 and located substantially nearer to the stop means 8 than the scanning edge 12, as is apparent from FIGS. 1 and 4. As is also apparent from FIG. 4, the scanning lever means 11 has a pair of connecting edges 13b and 14b extending between and interconnecting the scanning edge 12 with the additional edge portions 13a and 14a which are directed toward the stop means 8. These connecting edges 13b and 14b are respectively located in parallel planes which are perpendicular to the turning axis of the lever means 11 provided by the shaft 10 and the elongated stop means 8 which is substantially parallel to this turning axis, as was pointed out above.

A pair of screw members 15 shown in FIGS. 1 and 2 connect, in a manner described below, a springy member 16 made of a springy sheet metal, for example, to the scanning lever means 11 for turning movement therewith, and the springy member 16 has at its left end, as viewed in FIG. 1, a wall extending toward the stop means 8 alongside of the left end wall of the lever means 11, as viewed in FIG. 1. Instead of making the member 16 of a springy material it is possible to connect it through a suitable spring means to the scanning lever means 11. The left end wall of the member 16, as viewed in FIG. 1, terminates at its bottom edge in a row of teeth 17 (FIG. 4), and in the rest position shown in FIG. 1 the edge of the teeth 17 extend beyond the scanning edge 12 and slightly beyond the additional edges 13a and 14a toward the stop means 8, as is apparent from FIGS. 1 and 4. When the scanning lever means 11 turns in the direction of the arrow a from its rest position shown in FIG. 1 to its scanning position, the springy member 16 turns with the scanning lever means 11, and the toothed edge 17 will reach the pointer 7 before the scanning edge 12 or the additional edges 13a and 14a. As is apparent from FIG. 4 the teeth 17 include a pair of teeth 17a and 17b which are respectively aligned with and extend slightly beyond the connecting edges 13b and 14b, as is apparent from FIG. 4, so that if the pointer 7 should be in line with the connecting edge 13b the tooth 17a will direct the pointer either into engagement with the edge 13a or into engagement with the scanning edge, while if the pointer should be aligned with the connecting edge 14b the tooth 17b will direct the pointer either into engagement with the edge portion 14a or the scanning edge 12. Thus, the teeth 17a and 17b guarantee that the pointer will not be engaged by the intersection between the edges 13a and 13b or the intersection between the edges 14a and 14b and therefore a pointer will not suddenly snap into engagement with the scanning edge 12 so as to give a false reading.

As is shown in FIG. 1, the scanning lever means 11 fixedly carries an upwardly directed projection 18 which serves to provide cooperation between the scanning lever means 11 and an indicating means which will indicate to the operator whether or not a proper exposure can be made. This indicating means includes the lever 20 which is supported for rotary movement by a stationary pivot 21 carried by a stationary part of the camera and a spring 19 is connected at one end to the lever 20 and its opposite end to the upper wall of the cap 2 so as to urge the lever 20 to turn in a counterclockwise direction, as viewed in FIG. 1, about the pivot 21. The left end of the lever 21 engages the projection 18, as indicated in FIG. 1. Thus, the spring 19 maintains the left end of the lever 20, as viewed in FIG. 1, in engagement with the projection 18 of the lever 11, and as the latter lever turns the projection 18 will serve to transmit turning to the lever 20. This lever 20 of the indicating means carries a pair of indicator portions 22 and 23 which are located adjacent the right end of the lever 20, as viewed in FIG. 1, the indicator portion 23 being located directly next to the lever 20, while the indicating portion 22 is located beyond and connected to the indicating portion 23. In the position of the parts shown in FIG. 1, the indicating portion 22 extends across an opening 24 which is formed in a plate 25 which is located behind a window of the cap member 2 and which is formed, in addition to the opening 24, with cutouts which serve to provide images of the frame limits of the image which is seen through the viewfinder 26 which is diagrammatically indicated in FIG. 1. The light which passes through the openings of the plate 25 is transmitted through an unillustrated well known structure into the viewfinder so that when the operator looks through the viewfinder he will see in addition to the subject which is being photographed an image of the opening 24 as well as of the frame-limiting openings formed in the plate 25. The indicating portion 22 is made, for example, of a red translucent material so that when the parts are in the position of FIG. 1 a red image of the opening 24 will be visible in the viewfinder, and when the operator sees such a red image of the opening 24 the operator will know that a proper exposure cannot be made. When the lever 20 turns in opposition to the spring 19 in a clockwise direction, as viewed in FIG. 1, through an angle sufficient to locate the indicating portion 23 in alignment with the opening 24, the operator will know that a proper exposure can be made. This indicating portion 23 may be made, for example, of a green translucent material, so that when the operator sees a green image of the opening 24 in the field of the viewfinder the operator will know that the lighting conditions are such that a proper exposure can be made.

A drive lever means 27 is also turnably carried by the shaft 10 of the support means, and at its upper rear end the drive lever means 27 has an elongated projection 28 which extends parallel to and is located beneath the rear edge portion 29 of the lever means 11. This rear or right edge portion 29 of the lever means 11, as viewed in FIG. 1, is formed with a pair of openings through which the screw members 15 freely pass, and of course these screw members 15 also freely pass through a pair of openings of the springy member 16, the head ends of the screw members 15 directly engaging the springy member 16. The elongated projection 28 of the drive lever means 27 is formed with threaded openings aligned with the openings of elements 11 and 16 through which the screw members 15 pass, and these screw members are threaded into threaded openings of the portion 28 of the lever means 27. Coil springs 30 are coiled about the screw members 15 between the portion 20 of lever means 11 and the portion 28 of lever means 27, and these springs 30 urge portions 28 and 29 of lever means 27 and 11, respectively, apart from each other. Thus, the springs 30 urge the portion 29 of lever means 11 toward the head end of the screws 15 and thus maintain the springy element 16 against the head ends of the screw members 15. Thus, by turning the pair of screw members 15 it is possible to determine the angular position of the lever means 11 with respect to the shaft 10 and thus control the distance between the scanning edge 12 and the stop means 8 or the plane in which the pointer 7 sweeps. Thus, through the screws 15 and the interconnection of the lever means 11 with the lever means 27 the structure of the invention provides an adjusting means for adjusting the distance between the scanning edge 12 and the pointer 7 or the stop means 8. The drive lever means 27 extends through an opening 31 formed in the top wall 1 of the camera into the interior of the housing of the camera, and the lower end portion of the drive lever means 27 engages a pin 32 which is fixed to a lever 34 turnable about the stationary pin 33 which is carried by a stationary part of the camera, this lever 34 forming part of a transmission means which transmits the turning derived from the lever 27 during turning of the scanning lever means 11 to the structure which sets the exposure time and/or the exposure aperture of the camera.

As was pointed out above, the structure includes an adjusting means for adjusting the angular position of the scanning lever means 11 with respect to the axis of the shaft 10, this adjustment being carried out by turning of the screws 15. The adjusting means of the invention also is capable of adjusting the inclination of the scanning edge 12 so that the angular position of the scanning edge 12 relative to the plane in which the pointer 7 sweeps is also adjustable, and this latter adjustment is carried out by tilting the scanning lever means 11 so that one end of the scanning edge 12 approaches or moves away from the plane in which the pointer 7 sweeps. This adjustment of the inclination of the scanning edge 12 is carried out by a structure which includes the opening 35 in the side wall of the lever means 11 through which the shaft 10 passes. As is apparent from FIG. 3, the right side wall, as viewed in FIG. 3, of the lever 11 is formed with a convexly curved edge defining the opening 35, so that as a result of this curvature along the opening 35 the lever means 11 can easily tilt at its opening 35. At the side wall of the lever 11 which is opposed to that which is formed with the opening 35, the lever 11 is formed with an elongated slot 38, and this slot 38 which extends substantially perpendicularly to the top wall of the lever 11 receives a projection 37 of a block 36 which is axially bored to receive the shaft 10 in the manner shown in FIG. 3. The left side wall 11a of the lever 11, as viewed in FIG. 3, and the projection 37 are capable of sliding one with respect to the other along the axis of the slot 38 as a result of the sliding engagement of the projection 37 with the opposed side edges of the slot 38. The block 36 is formed with a threaded bore 39 which receives the threaded shank of a screw 40 which extends through an opening 41 formed in the top wall of the lever 11, this screw 40 having a head end 40a accessible at the upper side of the lever 11. A coil spring 42 surrounds the shank of the screw 40 between the block 36 and the underside of the top wall of the lever 11, and this spring 42 of course urges the top wall of the lever 11 away from the block 36 so as to maintain the top wall of the lever 11 in engagement with the underside of the head 40a of the screw 40. Thus, by turning the screw 40 with a suitable screwdriver, for example, the operator can cause the wall 11a of the lever 11 to move downwardly or upwardly with respect to the projection 37 as the slot 38 advances with the wall 11a either upwardly or downwardly along the projection 37, and as a result the end of the scanning edge 12 which is aligned with the block 36 will move up or down and thus it becomes possible in this way to adjust the inclination of the scanning edge with respect to the plane in which the pointer 7 sweeps. Thus, by turning the screw 40 in one direction the left wall 11a, as viewed in FIG. 3, will be moved in the direction of the arrow b shown in FIG. 3 so as to lower one end of the scanning edge 12, while turning of the screw 40 in the opposite direction will cause the spring 42 to raise the same end of the scanning edge 12.

A spring 42' (FIG. 1) is connected at one end to the portion 29 of the lever 11 and at its opposite upper end, as viewed in FIG. 1, to a stationary part of the camera, so that the spring 42' urges the lever means 11 to turn in a direction of the arrow a shown in FIG. 1, from the rest position shown in FIG. 1 to a scanning position where the scanning edge 12 will engage the pointer 7. The parts are held in the rest position shown in FIG. 1 in opposition to the spring 42' by an unillustrated return spring which is more powerful than the spring 42' and which is connected to the lever 34 so as to hold this lever in the position shown in FIG. 1 where the parts are retained in the position illustrated in opposition to the spring 42'.

An unillustrated manually operable release member is available to the operator for releasing the influence of the above-mentioned return spring on the element 34, and when such release is effected by the operator, the scanning lever means 11 is free to turn under the influence of the spring 42' in the direction of the arrow a. Assuming that the lighting conditions are such that a proper exposure can be made with the automatic apparatus, then the pointer 7 will be between the connecting edges 13b and 14b of the lever means 11. Of course, the springy member 16 turns with the lever 11 and thus the teeth 17 first engage the pointer 7 and urges the latter against the edges 8a and 8b of the elongated stop means 8. Because of the springy characteristics of the member 16, after the teeth 17 place the pointer 7 in engagement with the edges 8a and 8b of the stop means 8, the scanning lever means 11 can continue to turn in opposition to the springy member 16 until the scanning edge 12 engages the pointer 7, and because of the curvature of the scanning edge 12, as shown in FIG. 4, it is apparent that the extent of turning of the lever means 11 will depend on the angular position of the pointer 7 so that in this way the camera may be set automatically according to the lighting conditions. The turning of the lever 11 is transmitted through the drive lever 27 to the lever 34 through the pin 32 thereof and this lever 34 in a known way actuates the structure for setting the exposure time and/or the structure for setting the exposure aperture.

In addition, the turning of the scanning lever means 11 acts through the projection 18 thereof on the lever 20 to turn the latter in opposition to the spring 19 in a clockwise direction, as viewed in FIG. 1, and in this way the red indicating portion 22 is displaced downwardly beyond the opening 24 and the green portion 23 becomes aligned with the opening 24 so that the operator sees in the field of the viewfinder the green image of the opening 24 and thus knows that a proper exposure can be made.

In the event that there is so little light available that a proper exposure cannot be made, the pointer 7 is in the region of the edge portion 14a of the scanning lever means 11, so that when the structure is released for operation so that the spring 42' turns the lever means 11 in the direction of the arrow a of FIG. 1, the pointer will be engaged by the edge portion 14a, and the extent of turning of the scanning lever means will in this event be much less than when the pointer 7 is aligned with the scanning edge 12. Thus, the edge 14a limits the turning of the lever means 11 to a small fraction of the turning thereof when the pointer 7 is aligned with the scanning edge 12, and the parts are so designed that the lever 11 when the edge portion 14a engages the pointer 7 will not have turned the lever 20 through an angle sufficient to displace the red indicating portion 22 beyond the opening 24, and thus at this time the operator will see a red image of the opening 24 in the viewfinder and will therefore know that the lighting conditions are such that it is not possible to make a proper exposure.

The same results are produced in the event that there is too much light available for a proper exposure. In this event a pointer 7 will be aligned with the edge portion 13a of the scanning lever means 11, and thus the lever means 11 will turn to the same angular position that it has when there is too little light available, and the operator again will see a red image of the opening 24 and will therefore know that a proper exposure cannot be made. Of course, as was pointed out above, when a borderline situation prevails where the pointer is aligned either with the connecting edge 13b or the connecting edge 14b, then the teeth 17a and 17b will guarantee that the pointer is moved either into engagement with the edge 13a or into engagement with the scanning edge 12, and it will not be possible for the pointer to be engaged by the intersection between the edges 13a and 13b or the intersection between the edges 14a and 14b, so that after the operation starts the pointer might snap suddenly along one of the edges 13b or 14b to give a false indication.

In the event that the inclination of the scanning edge 12 is such that when it engages the pointer 7 there will be no tendency for the pointer 7 to slip along the edge 12, it is unnecessary to provide the entire row of teeth on the springy element 16, and this element may simply have the pair of teeth 17a and 17b which function as described above. On the other hand, if the curve 12 is inclined at a relatively sharp angle to the plane of the pointer 7, the pointer 7 will of course have a tendency to slip when engaged by the edge 12, and in this case the teeth 17 guarantee that the pointer 7 is retained in the angular position it had just prior to release of the scanning lever means 11 to the spring 42'.

Another embodiment of a scanning lever means according to the invention is illustrated in FIGS. 5 and 6. According to this embodiment, the scanning lever means includes a pair of portions 43 and 47. The portion 43 is directly turnable on the shaft 10 as described above, while the portion 47 is provided with the scanning edge 51 as well as with a springy member 48 which corresponds to the springy member 16 and operates in the same way. According to this embodiment the portion 47 of the scanning lever means is provided with a rear portion overlapping and located above the front portion of the part 43, and this rear portion of the part 47 is formed with a pair of openings through which a pair of screws 45 freely pass, these screws having their head ends in engagement with the springy member 48 to maintain the latter assembled with the member 47. The part 43 of the scanning lever means is formed with a pair of threaded bores 44 which receive the screws 45, and between the parts 43 and 47 are located a pair of leaf springs 49 and 50 which urge the upper part 47 away from the lower part 43. Thus by turning both of the screws 45 it is possible to adjust the elevation of the scanning edge 51 with respect to the plane in which the pointer 7 turns. It will be noted that the leaf spring 49 is an arcuate member formed with an opening through which the screw 45 shown at the right of FIG. 6 freely passes, so that this member 49 serves as an element on which the part 47 is capable of rocking laterally, and of course the clearance of the opening 46 in the member 47 through which the screws 45 pass is large enough to permit unrestrained rocking of the element 47 within the desired limits. The leaf spring 50 which is riveted to the element 43 in the manner shown in FIG. 6 is also formed with an opening through which the left screw 45 of FIG. 6 freely passes, and by turning this left screw 45 of FIG. 6 it is possible to raise or lower the left end of the scanning edge 51 shown in FIG. 6, and in this way it is possible to adjust the inclination of the scanning edge 51 with respect to the plane in which the pointer 7 sweeps. Thus, the embodiment of FIG. 6 also provides adjustment both in elevation and inclination of the scanning edge 51 of the scanning lever means. The scanning lever means of FIGS. 5 and 6 cooperates in the manner described above with a drive lever 27 for transmitting the turning to the structure which sets the exposure time and/or the exposure aperture, and also an unillustrated projection similar to the projection 18 cooperates with the structure for turning the lever 20 of the indicating means. Of course, in the embodiment of FIGS. 5 and 6 the drive lever 27 may be fixed with the lateral projection of the element 43 which is formed with the opening which receives the shaft 10. The spring 49 instead of being a simple arcuate element shown in FIG. 6 may have a construction similar to the spring 50, if desired.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; elongated stop means carried by said support means; scanning lever means turnably carried by said support means for movement about an axis substantially parallel to said elongated stop means, said lever means having an elongated scanning edge which is located substantially within a given plane and which is directed toward said stop means, and said lever means being turnable from a rest position where said scanning edge is spaced from and defines an elongated gap with said stop means toward said stop means to a scanning position where said scanning edge is closely adjacent to said stop means; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means.

2. In a camera, in combination, support means; elongated stop means carried by said support means; scanning lever means turnably carried by said support means for movement about an axis substantially parallel to said elongated stop means, said lever means having an elongated, curved scanning edge which is located substantially within a given plane and which is directed toward said stop means, and said lever means being turnable from a rest position where said scanning edge is spaced from and defines an elongated gap with said stop means toward said stop means to a scanning position where said scanning edge is closely adjacent to said stop means; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means.

3. In a camera, in combination, support means; elongated stop means carried by said support means; scanning lever turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means, said lever means having at at least one end of said scanning edge an additional edge portion located substantially closer to said stop means than said scanning edge; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means, said pointer when aligned with said additional edge portion of said lever means limiting the turning of the latter from said rest position thereof to a relatively small fraction of the extent of turning of said lever means when said pointer is between said scanning edge thereof and said stop means.

4. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means, said lever means having at the ends of said scanning edge a pair of additional edge portions directed toward said stop means and located substantially closer to the latter than said scanning edge; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means, said pointer when aligned with one or the other of said pair of additional edge portions being engaged by the latter to limit the turning of said lever means from said rest position thereof to a relatively small fraction of the turning of said lever means from said rest position thereof when said pointer is aligned with said scanning edge.

5. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means, said lever means having at at least one end of said scanning edge an additional edge portion located substantially closer to said stop means than said scanning edge; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means, said pointer when aligned with said additional edge portion of said lever means limiting the turning of the latter from said rest position thereof to a relatively small fraction of the extent of turning of said lever means when said pointer is between said scanning edge thereof and said stop means; and indicating means operatively connected to said scanning lever means for indicating to the operator when said lever means turns through an angle large enough to place said scanning edge in engagement with said pointer, so that the operator will only make an exposure when said scanning edge engages said pointer.

6. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means, said lever means having at at least one end of said scanning edge an additional edge portion located substantially closer to said stop means than said scanning edge; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means, said pointer when aligned with said additional edge portion of said lever means limiting the turning of the latter from said rest position thereof to a relatively small fraction of the extent of turning of said lever means when said pointer is between said scanning edge thereof and said stop means; and indicating means operatively connected to said scanning lever means for indicating to the operator when said lever means turns through an angle large enough to place said scanning edge in engagement with said pointer, so that the operator will only make an exposure when said scanning edge engages said pointer, said indicating means being responsive to turning of said scanning lever means and carrying an indicating portion at least an image which is visible to the operator when said scanning lever means is in said rest position thereof as well as when said edge portion of said scanning lever means nearer to said stop means engages said pointer, said indicating portion of said indicating means being invisible only when said scanning lever means turns through an angle great enough to place said scanning edge in engagement with said pointer.

7. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edges is closely adjacent to said stop means, said lever means having at at least one end of said scanning edge an additional edge portion directed toward said stop means and located substantially nearer to the latter than said scanning edge, and said lever means having a connecting edge portion extending between said additional edge portion and said end of said scanning edge and located substantially in a plane perpendicular to said turning axis of said scanning lever means and said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means, said pointer when aligned with said additional edge portion limiting the turning of said lever means from said rest position thereof to a relatively small fraction of the turning of said lever means when said pointer is aligned with said scanning edge; and a springy member carried by said lever means for turning movement therewith and having at least one tooth aligned with said connecting edge and extending slightly beyond the intersection of said connecting edge and additional edge portion of said lever means toward said stop means, so that when said pointer is aligned with said connecting edge of said lever means said tooth of said springy member will direct said pointer either into alignment with said additional edge portion or into alignment with said scanning edge of said lever means.

8. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is located closely adjacent to said stop means, said lever means respectively having at the ends of said scanning edge a pair of additional edge portions located substantially closer to said stop means than said scanning edge and a pair of connecting edges respectively extending between said additional edge portions at said scanning edge and respectively located in planes which are perpendicular to said axis and said stop means; an electrical instrument carried by said support means and forming part of a light-measuring assembly, said instrument having a turnable pointer which is located at all times in said gap in the path of movement of said scanning edge and engaging said scanning edge when said lever means turns from said rest position to said scanning position, to be placed by said scanning edge against said stop means to limit turning of said lever means, said pointer when aligned with one or the other of said additional edge portions limiting the turning of said lever means to a relatively small fraction of the turning thereof when said pointer is aligned with said scanning edge; and a springy member carried by said lever means for turning movement therewith and having at least a pair of teeth aligned with said connecting edges and extending slightly beyond the intersections between said connecting edges and said additional edge portions of said lever means toward said stop means, whereby when said pointer is aligned with one or the other of said connecting edges one or the other of said teeth of said springy member will cooperate with said pointer to direct the latter either to one of said additional edges or to said scanning edge.

9. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means; and a springy member carried by said lever means for turning movement therewith and having an elongated free end portion extending alongside of and beyond said scanning edge toward said stop means and terminating in a row of teeth which engages said pointer in advance of said scanning edge during turning of said lever means from said rest position to said scanning position thereof, whereby said springy member arrests said pointer and yieldably holds the same against said stop means while said scanning edge approaches and engages said pointer.

10. In a camera, in combination, support means; elongated stop means carried by said support means; scanning lever means turnably carried by said support means for movement about an axis substantially parallel to said elongated stop means, said lever means having an elongated scanning edge which is located substantially within a given plane and which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer which turns in a plane which extends through said gap and said pointer being located at all times in said gap in the path of movement of said scanning edge and engaging said scanning edge when said lever means turns from said rest position to said scanning position, to be placed by said scanning edge against said stop means to limit turning of said lever means; and adjusting means operatively connected to said lever means for adjusting the inclination of said scanning edge with respect to and the distance of said scanning edge from said plane.

11. In a camera, in combination, a support means; elongated stop means carried by said support means; scanning lever means turnably carried by said support means for movement about an axis substantially parallel to said elongated stop means, said lever means having an elongated scanning edge which is located substantially within a given plane and which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means; drive lever means carried by said support means for turning movement about said axis and cooperating with said lever means for transmitting turning thereof to part of a structure which participates in the setting of the camera; and adjusting means cooperating with said scanning lever means for adjusting the latter with respect to said drive lever means.

12. In a camera, in combination, a support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means; drive lever means carried by said support means for turning movement about said axis and cooperating with said lever means for transmitting turning thereof to part of a structure which participates in the setting of the camera; and adjusting means cooperating with said scanning lever means for adjusting the latter with respect to said drive lever means, said adjusting means including a pair of portions of said scanning lever means and drive lever means which are substantially parallel to and spaced from each other, at least one spring located between and engaging said parallel portions for urging the same apart from each other, and a screw member passing through one of said parallel portions and threaded to the other of said parallel portions for adjusting the distance between said parallel portions.

13. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means; and adjusting means operatively connected to said scanning lever means for tilting the latter in a direction which adjusts the distance of at least one end of said scanning edge from said stop means.

14. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means; an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means; and adjusting means operatively connected to said scanning lever means for tilting the latter in a direction which adjusts the distance of at least one end of said scanning edge from said stop means, said scanning lever means having at said turning axis thereof a pair of portions spaced from each other along said axis and one of which is tiltable with respect to said axis, said adjusting means adjusting the location of the other of said spaced portions with respect to said axis so as to tilt said lever means and thus tilt said end of said scanning edge toward or away from said stop means.

15. In a camera as recited in claim 1, said scanning lever means having a pair of opposed side wall portions one of which is formed with an opening and the other of which is formed with an elongated slot through which said axis passes, said support means including an elongated shaft extending along said axis through said opening of said one side wall portion and through said slot; a block formed with a bore through which said shaft passes and having a free end portion located in said slot so as to guide said lever for tilting movement with respect to said shaft about the engagement between said shaft and said one side wall portion of said lever means at said opening of said one side wall portion while said other side wall portion of said lever means is displaced at said slot thereof with respect to said end portion of said block, a screw member extending through an additional wall of said lever means which extends between said side wall portions thereof into threaded engagement with said block and spring means urging said additional wall portion away from said block whereby said screw member may be turned for moving said other side wall portion at said slot along said end portion of said block for adjusting the inclination of said lever means with respect to said axis and thus for adjusting the inclination of said scanning edge.

16. In a camera, in combination, support means; elongated stop means carried by said support means; scanning lever means turnably carried by said support means for movement about an axis substantially parallel to said elongated stop means, said lever means having an elongated scanning edge which is located substantially within a given plane and which is directed toward said stop means, and said lever means being turnable from a rest position where said scanning edge is spaced from and defines an elongated gap with said stop means toward said stop means to a scanning position where said scanning edge is closely adjacent to said stop means, said lever means including a pair of portions one of which is turnable about said axis and the other of which is provided with said scanning edge; adjusting means cooperating with said pair of portions of said lever means for adjusting said pair of portions of said lever means with respect to each other; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means.

17. In a camera, in combination, support means; elongated stop means carried by said support means; scanning lever means turnably carried by said support means for movement about an axis substantially parallel to said elongated stop means, said lever means having an elongated scanning edge which is directed toward said stop means, and said lever means being turnable from a rest position where said scanning edge is spaced from and defines an elongated gap with said stop means toward said stop means to a scanning position where said scanning edge is closely adjacent to said stop means, said lever means including a pair of portions one of which is turnable about said axis and the other of which is provided with scanning edge, spring means urging said pair of portions apart from each other, and screw means interconnecting said pair of portions at an adjustable selected distance with respect to each other; and an electrical instrument carried by said support means and forming part of a light-measuring assembly, said instrument having a turnable pointer part of which is located at all times in said gap in the path of movement of said scanning edge and engaging said scanning edge when said lever means turns from said rest position to said scanning position, to be placed by said scanning edge against said stop means to limit turning of said lever means.

References Cited in the file of this patent

UNITED STATES PATENTS

| | | |
|---|---|---|
| 2,325,463 | Axler | July 27, 1943 |
| 2,930,282 | Herterich | Mar. 29, 1960 |
| 2,940,046 | Herterich | June 7, 1960 |
| 3,005,390 | Hahn | Oct. 24, 1961 |
| 3,018,705 | Morelle | Jan. 30, 1962 |